United States Patent
Shah et al.

(10) Patent No.: US 11,320,364 B2
(45) Date of Patent: May 3, 2022

(54) WATER HEATER SENSOR

(71) Applicants: Karina Divyesh Shah, Milton, GA (US); Ethan Pierre Gougelmann, Alpharetta, GA (US); Sarayu Chelamcharla Reddy, Milton, GA (US); Ariana Samia Islam, Roswell, GA (US); Sophia Anne Hernandez, Johns Creek, GA (US)

(72) Inventors: Karina Divyesh Shah, Milton, GA (US); Ethan Pierre Gougelmann, Alpharetta, GA (US); Sarayu Chelamcharla Reddy, Milton, GA (US); Ariana Samia Islam, Roswell, GA (US); Sophia Anne Hernandez, Johns Creek, GA (US)

(*) Notice: Subject to any disclaimer, the term of this patent is extended or adjusted under 35 U.S.C. 154(b) by 28 days.

(21) Appl. No.: 16/874,053

(22) Filed: May 14, 2020

(65) Prior Publication Data
US 2021/0356385 A1 Nov. 18, 2021

(51) Int. Cl.
*G01N 17/00* (2006.01)
*G01N 17/04* (2006.01)
(Continued)

(52) U.S. Cl.
CPC .......... *G01N 17/04* (2013.01); *F24H 1/0018* (2013.01); *F24H 9/45* (2022.01); *G08B 7/06* (2013.01); *G08B 21/182* (2013.01)

(58) Field of Classification Search
CPC ........ G01N 17/04; G08B 7/06; G08B 21/182; F24H 1/0018; F24H 9/0047
See application file for complete search history.

(56) References Cited

U.S. PATENT DOCUMENTS 6,077,418 A * 6/2000 Iseri .................. G01N 17/043
  205/775.5
6,564,620 B1 * 5/2003 Jaeger ................ G01N 17/04
  73/86

(Continued)

FOREIGN PATENT DOCUMENTS

| CN | 2192891 Y | 3/1995 |
| CN | 101852495 B | 7/2012 |
| CN | 110131894 A | 8/2019 |

OTHER PUBLICATIONS

International Search Report and Written Opinion, issued by the U.S. Patent and Trademark Office as International Searching Authority in International Application PCT/US21/32262, dated Aug. 13, 2021 (11 pages).

*Primary Examiner* — Ojiako K Nwugo
(74) *Attorney, Agent, or Firm* — Wilmer Cutler Pickering Hale and Dorr LLP

(57) ABSTRACT

Disclosed systems and methods relate to a water heater sensor for detecting a corrosion of an anode rod. According to embodiments, a system can include the anode rod in contact with water in a water heater, where the anode rod includes a corrodible sheath having a cavity. The system can include two electrical wires, where first ends of the two electrical wires, disposed within the cavity, are configured to come in contact with the water when the corrodible sheath of the anode rod corrodes to a certain point. The system can include a controller coupled to second ends of the two electrical wires, where the controller can detect whether the water is in contact with the first ends of the two electrical wires. The system can include an indicator to provide an indication when the water is in contact with the first ends of the two electrical wires.

18 Claims, 6 Drawing Sheets

(51) Int. Cl.
   *F24H 1/00*    (2022.01)
   *G08B 7/06*    (2006.01)
   *G08B 21/18*   (2006.01)
   *F24H 9/45*    (2022.01)

(56) References Cited

U.S. PATENT DOCUMENTS

| | | |
|---|---|---|
| 7,495,450 B2 | 2/2009 | Furse et al. |
| 8,245,669 B2 | 8/2012 | Phillips et al. |
| 8,890,703 B2 | 11/2014 | Farris et al. |
| 2004/0222084 A1* | 11/2004 | Wigg ............... C23F 13/22 204/196.06 |
| 2007/0296435 A1 | 12/2007 | Eldridge et al. |
| 2009/0056644 A1* | 3/2009 | Phillips ............ F24H 9/2007 122/15.1 |
| 2014/0376899 A1* | 12/2014 | Boros ............... F24H 9/2021 392/457 |
| 2017/0193794 A1* | 7/2017 | Farris ............... F24H 9/0047 |
| 2020/0348049 A1* | 11/2020 | Knoeppel ......... C23F 13/22 |
| 2021/0276890 A1* | 9/2021 | Andrew ............ C02F 1/46109 |

* cited by examiner

WATER HEATER SENSOR

FIELD OF THE INVENTION

Embodiments of the invention relate to water heaters.

BACKGROUND

Water heaters can be used to transform thermal energy from a fuel source to a stream or reservoir of water. Water heaters can transmit heat into incoming cold water thereby converting the cold water into heated water. Water heaters, for example, can be installed in buildings and supply heated water for drinking, cooking, cleaning, showering, bathing, etc.

Water heaters can react with oxygen in water and corrode over time. For example, inner layers of water heaters can corrode and contaminate the heated water with rust. Such water contamination can be unpleasant or pose health risks to the water users. In another example, a corrosion can cause water leakage in water heaters, which can flood the surrounding area. In such cases, the corroded water heaters may need to be replaced, incurring high costs. Therefore, there is a need to prevent water heater leakage or rusting and extend the lifespan of the water heaters.

SUMMARY

Systems and methods for protecting water heaters from corrosion are provided. According to embodiments, a sensor system for a water heater can include two electrical wires, each electrical wire having a first end and a second end, wherein the first ends of the two electrical wires are disposed within a cavity of an anode rod disposed in water in a water heater such that, when the anode rod is sufficiently corroded, the first ends come in contact with the water in the water heater. The sensor system can also include a controller coupled to the second ends of the two electrical wires, and the controller can be configured to detect whether the water is in contact with the first ends of the two electrical wires. The sensor system can also include an indicator coupled to the controller, and the indicator can be configured to provide an indication when the controller detects that the water is in contact with the first ends of the two electrical wires.

According to embodiments, the anode rod can further include a corrodible sheath in contact with the water in the water heater. In some embodiments, the anode rode can further include a stay rod disposed in a center of the corrodible sheath, and located adjacent or near the cavity.

According to embodiments, the corrodible sheath can include magnesium, aluminum, zinc, and/or tin.

According to embodiments, the sensor system can further include a probe that can be configured to hold the first ends of the two electrical wires apart, where the probe is disposed within the cavity.

According to embodiments, the indicator can include a light, an audible alert, or a transmitter for sending a notification to be displayed by a display device.

According to embodiments, the controller can include a microcontroller that can be configured to execute instructions to periodically measure conductivity between the first ends of the two electrical wires. In some embodiments, the microcontroller can be further configured to execute instructions to compare the measured conductivity to a threshold to determine whether the water is in contact with the first ends of the two electrical wires. In some embodiments, the microcontroller can be further configured to execute instructions to cause the indicator to provide the indication when the measured conductivity is equal to or exceeds the threshold.

According to embodiments, the sensor system can further include a conductivity sensor that can be configured to measure the conductivity between the first ends of the two electrical wires. In some embodiments, the conductivity sensor can be further configured to transmit the measured conductivity to the microcontroller.

According to embodiments, the sensor system can further include a power source that can be configured to provide power to the controller. In some embodiments, the controller can include a 555 timer integrated circuit ("555 timer IC") with a plurality of pins, and the 555 timer IC can be configured to receive a voltage of the power source in a reset pin of the 555 timer IC when the water is in contact with the first ends of the two electrical wires, where the reset pin and the power source are coupled to the second ends of the two electrical wires. In some embodiments, the 555 timer IC can be further configured to, in response to receiving the voltage of the power source in the reset pin, output an oscillating electronic signal in an output pin coupled to the indicator.

According to embodiments, the sensor system can further include a power source configured to provide power to the controller. The sensor system can also include a light-emitting diode coupled to the power source to indicate a power level of the power source. The sensor system can also include a plurality of resistors and a capacitor coupled to the 555 timer IC, wherein a frequency of the oscillating electronic signal output is controlled by adjusting resistance of the plurality of resistors and capacitance of the capacitor.

According to embodiments, the sensor system can further include a housing that can be configured to attach to the water heater. In some embodiments, the controller can be disposed within the housing.

According to embodiments, the housing can be further configured to include a magnet for attaching the housing to a metal part of the water heater.

According to embodiments, the water heater can include a metal in contact with the water, and the corrodible sheath can include a material that, when in contact with the water, corrodes before the metal.

According to embodiments, a method for detecting a corrosion of an anode rod can include contacting the anode rod with water in a water heater, the anode rod having a cavity disposed therein. The method can also include providing two electrical wires, each electrical wire having a first end and a second end, wherein the first ends of the two electrical wires can be disposed within the cavity such that, and when the anode rod is sufficiently corroded, the first ends can come in contact with the water in the water heater. The method can also include detecting, using a controller coupled to the second ends of the two electrical wires, whether the water is in contact with the first ends of the two electrical wires. The method can also include indicating to a water heater user, using an indicator coupled to the controller, when the controller detects that the water is in contact with the first ends of the two electrical wires.

According to embodiments, the anode rod can further include a corrodible sheath in contact with the water in the water heater. In some embodiments, the anode rod can further include a stay rod disposed in a center of the corrodible sheath, and located adjacent or near the cavity.

According to embodiments, the corrodible sheath can include magnesium, aluminum, zinc, and/or tin.

According to embodiments, the sensor system can further include a probe that can be configured to hold the first ends of the two electrical wires apart, where the probe is disposed within the cavity.

According to embodiments, the controller can include a microcontroller. In some embodiments, the method can further include periodically measuring, using a conductivity sensor, conductivity between the first ends of the two electrical wires. The method can also include sending the measured conductivity to the microcontroller. The method can also include comparing, using the microcontroller, the measured conductivity to a threshold to determine whether the water is in contact with the first ends of the two electrical wires. The method can also include controlling the indicator, using the microcontroller, to indicate to the water heater user when the measured conductivity is equal to or exceeds the threshold.

According to embodiments, the controller can include a 555 timer integrated circuit ("555 timer IC") with a plurality of pins. In some embodiments, the method can further include providing power, from a power source, to the controller. The method can also include receiving a voltage of the power source in a reset pin of the 555 timer IC when the water is in contact with the first ends of the two electrical wires, wherein the reset pin and the power source are coupled to the second ends of the two electrical wires. The method can also include, in response to receiving the voltage of the power source in the reset pin, outputting an oscillating electronic signal in an output pin of the 555 timer IC coupled to the indicator.

According to embodiments, the method can further include providing power, from a power source, to the controller. The method can also include using a light-emitting diode light coupled to the power source, a power level of the power source. The method can also include attaching a plurality of resistors and a capacitor to the 555 timer IC. The method can also include controlling a frequency of the oscillating electronic signal output by adjusting resistance of the plurality of resistors and capacitance of the capacitor.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Described herein are systems and methods of protecting water heaters from corrosion.

Figure 1:
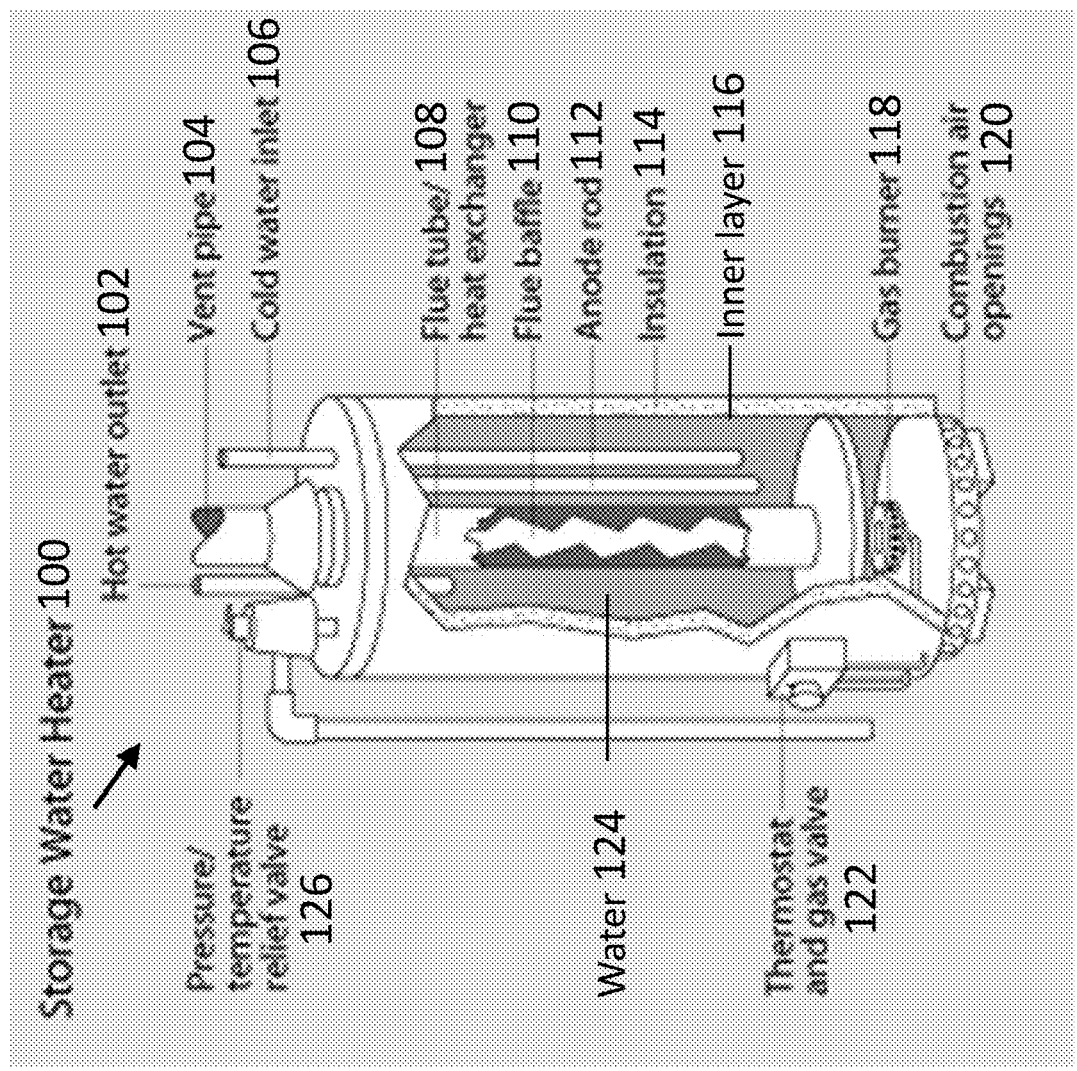
FIG. 1 is an exemplary diagram of a water heater in accordance with some embodiments.

FIG. 1 is an exemplary diagram of a storage water heater (100) in accordance with some embodiments. The storage water heater (100), for example, can be installed in a building and supply heated water into the building for drinking, cooking, cleaning, showering, bathing, etc. In some embodiments, the storage water heater (100) can include various pipes such as a hot water outlet pipe (102), a vent pipe (104), and a cold water inlet pipe (106). Cold water (e.g., tap water) can flow into the water heater (100) through the cold water inlet pipe (106). In some embodiments, the cold water (e.g., tap water) in the water heater (100) can be heated using a gas burner (118). The gas burner (118), for example, can burn natural gas with an air that can enter through combustion air openings (120). In some embodiments, exhaust from the gas burner (118) can be vented through a vent pipe (104). The heated water can leave the water heater (100) through the hot water outlet pipe (102). It will be appreciated that the use of the gas burner (118) herein has been selected for illustrative purposes and that in other embodiments and applications, water heaters can use electricity to heat water.

Continuing with FIG. 1, in some embodiments, the water heater (100) can include an inner layer (116), which can be in contact with water (124) such as tap water in the water heater (100). An inner layer (116) can comprise metal, such as iron or steel, and a glass lining to protect the metal from corroding. In some embodiments, a glass lining may not be able to fully protect the metal part of the inner layer (116) from corroding. For example, due to limitations in manufacturing processes, some parts of the inner layer metal may be exposed to tap water in the water heater (100). In another example, a glass lining can degrade or otherwise become damaged over time, exposing the metal part of the inner layer (116) to tap water in the water heater (100).

Tap water described herein can include water with various minerals such as any chlorine compounds, any fluorine compounds, any trihalomethane compounds (THMs), any nitrate compounds, any salts of arsenic, radium, aluminum, copper, lead, mercury, cadmium, or barium. In some embodiments, tap water with various minerals can corrode the water heater (100). For example, tap water can rust the metal part of the inner layer (116). In some embodiments, rust can be formed by a reaction of oxygen and metal (e.g., iron) in the presence of water/air moisture. The basis of rusting process is that metal (e.g., iron) can be dissolved or corroded by oxygen, and then can be combined with hydrogen and leftover oxygen atoms in the water to form rust. A chemical equation below shows an example of iron (Fe) reacting with oxygen ($O_2$) and water ($H_2O$) to form rust ($Fe(OH)_3$).

$$4Fe + 3O_2 + 6H_2O \rightarrow 4Fe(OH)_3$$

In some embodiments, rust chemical reactions in the water heater (100) can contaminate the water (124) with rust or damage the water heater (100) to leak. In the event of such contamination or leakage, the water heater (100) may need to be replaced, incurring high costs. In some embodiments, tap water with high mineral contents (e.g., hard water) can corrode the water heater (100) faster. For example, harder water can cause a sediment in the water heater (100) to build up faster, which can cause more rusting. In some embodiments, sediment build up at the bottom of water heater (100), can lead to more problems than just rust. For examples, such sediment build up can cause the water heater (100) to create waste gas, deteriorate the tank, and cease to produce enough heat, which can allow harmful bacteria to grow in the water heater (100).

Continuing with FIG. 1, in some embodiments, the water heater (100) can include an anode rod (112), which can be submerged in the water (124). In some embodiments, anode rod(s) can have different lengths. For example, an anode rod (112) can be as long as about 51 inches in length or longer. In some embodiments, an anode rod (112) described herein can include a corrodible sheath designed to corrode in place of the water heater's inner layer (116), thereby preventing the water heater (100) from corroding or rusting. For example, an anode rod (112) can sacrifice itself to protect the exposed inner layer (116) or other parts of the water heater (100). In some embodiments, an electrolysis can happen when two or more pieces of metal are in electrical contact with one another, for example, inside the water (124). During the electrolysis, for example, the more noble (e.g., less reactive) metal such as aluminum, magnesium, tin, or zinc, can corrode over the less noble (e.g., more reactive) metal such as iron or steel. Therefore, in some embodiments, an anode rod (112) can include a corrodible sheath that may comprise any metals such as steel, aluminum, magnesium, zinc, tin, or any mixture thereof. For example, an anode rod (112) can comprise a steel core wire (e.g., stay rod) surrounded by a corrodible sheath comprising any metals such as aluminum, magnesium, tin, zinc, or any mixture thereof that are less noble (e.g., more reactive) than the water heater's inner layer (116) such as steel. In some embodiments, an anode rod (112) can corrode before the water heater's inner layer (116) such that the water heater's inner layer (116) may not corrode until the anode rod (112) has been first corroded. For example, a corrodible sheath of an anode rod (112) can draw oxygen from the water heater (100), therefore, the oxygen can react with the corrodible sheath of the anode rod (112) and corrode the anode rod (112) first. In some embodiments, once the anode rod (112) has been corroded to near completion, the oxygen may begin attacking/corroding the water heater's inner layer (116) comprising steel.

In some embodiments, an anode rod (112) can last up to 4-5 years, depending on the amount of water cycled/traveled through the water heater (100). In some embodiments, water softener (e.g., sodium) can shorten the life of the anode rod (112). In some embodiments, it may be desirable to replace the anode rod (112) before it is corroded to near completion. In some embodiments, it may be preferable to replace the anode rod (112) when it is still intact and not substantially corroded. For example, it may be preferable to replace the anode rod (112) when about 50% or more (e.g., anywhere from 50-100%) of the rod has been corroded. For example, substantially corroded anode rod (112) can break off and the broken off piece(s) can fall to the bottom of the water heater (100). The broken anode rod piece(s) can bounce around, for example, when water cycles/passes through the water heater (100), and can damage the water heater's inner layer (116). In some embodiments, the broken anode rod piece(s) can bounce around and crack the glass lining of the water heater (100), which can shorten the lifespan of the water heater (100). In another example, substantially corroded anode rod (112) may not effectively prevent water heater (100) from corroding.

In some embodiments, an anode rod (112) can cause a distinctive smell (e.g., rotten egg like smell) from sulfuric reactions with the metals (e.g., magnesium, aluminum, tin, or zinc), which can create hydrogen sulfide gas. Such smell, for example, can indicate that the anode rod (112) has been corroded.

Embodiment 1

Figure 2B:
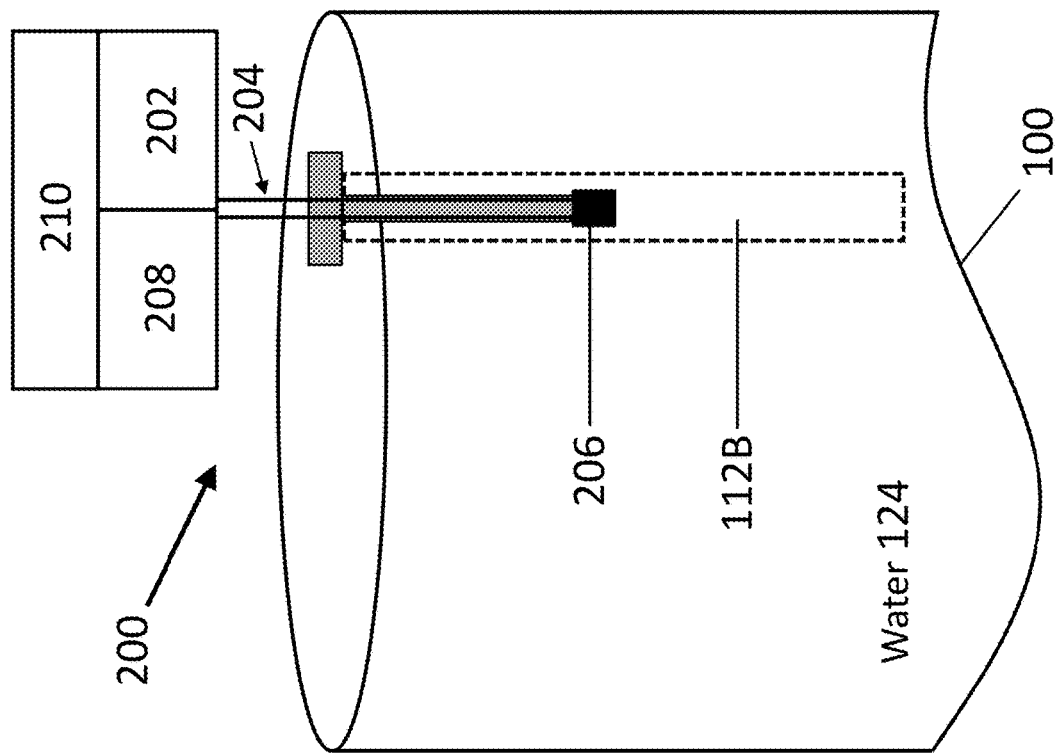
FIG. 2A and FIG. 2B are exemplary diagrams of a sensor system (200) in accordance with some embodiments.
Figure 2A:
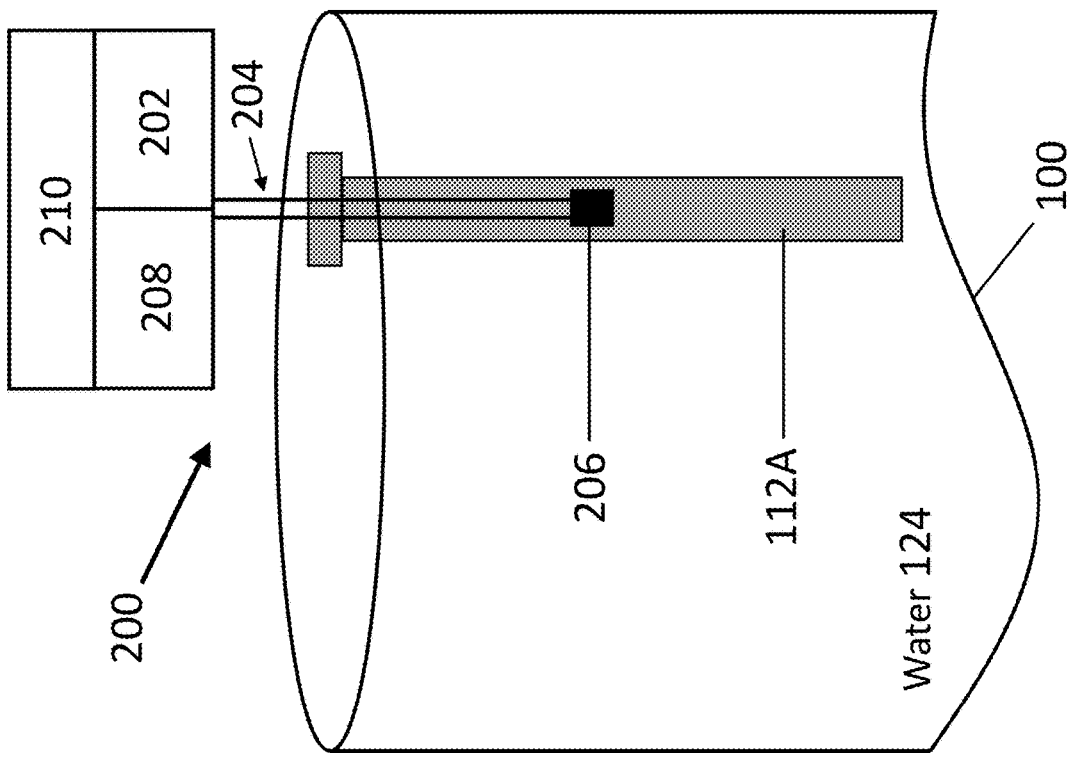

FIG. 2A and FIG. 2B are exemplary diagrams of a sensor system (200) in accordance with some embodiments. In some embodiments, the sensor system (200) can include a controller (202), one or more indicators (208), a power source (210), and an anode rod (112A/B) with two wires (204) and a probe (206). FIG. 2A shows an exemplary diagram of the sensor system (200) with a new (e.g., uncorroded) anode rod (112A) for the storage water heater (100) (e.g., showing only a portion of the water heater) that can be filled with the water (124). FIG. 2B shows an exemplary diagram of the sensor system (200) for the same storage water heater (100) with a used anode rod (112B) that has been corroded for a certain period of time up to a certain point. In some embodiments, the sensor system (200) can be configured to output signal(s) (e.g., light and/or sound) when an anode rod has been corroded/rusted up to a certain point, as illustrated in FIG. 2B. For example, the sensor system (200) can be configured to output signal(s) when about 50% or more (e.g., 50-100%) of the anode rod has been corroded/rusted away.

Continuing with FIGS. 2A and 2B, in some embodiments, the two wires (204) can be coupled to the probe (206). In some embodiments, at least parts of the two wires (204) and the probe (206) can be disposed within the anode rod (112A/B). For example, one or more cavities, holes, or other empty spaces can be made (e.g., by drilling) in the anode rod (112A/B), and the two wires (204) and the probe (206) can be placed in such one or more cavities or holes within the anode rod (112A/B). In some embodiments, the anode rod (112A/B) can be a corrodible sheath that can enclose the two wires (204) and the probe (206), which prevents the two wires (204) and/or the probe (206) from coming in contact with the water (124) until the anode rod corrodes up to a certain point. The corrodible sheath may comprise magnesium, aluminum, zinc, and/or tin. In some embodiments, one or more cavities or holes can have a depth of about a quarter to the half the length of the rod (e.g., depth can be measured along the length of the anode rod). For example, for an anode rod that is about 50 inches long, one or more cavities or holes can be drilled to be about 12-25 inches deep, such that the probe (206) can be placed about 12-25 inches from the top of the anode rod (112A/B). In some embodiments, one or more cavities or holes can have a different depth anywhere from zero to the entire length of the rod. In some embodiments, the one or more cavities or holes can be drilled near or adjacent to the central steel core (e.g., stay rod) of the anode rod (112A/B). In some embodiments, the anode rod (112A/B) can be manufactured with the two wires (204) and the probe (206) placed inside the anode rod (112A/B).

Continuing with FIGS. 2A and 2B, in some embodiments, a controller (202) of the sensor system (200) can be configured to receive a trigger output when the probe (206)

comes in contact with the water (124). For example, the anode rod (112A) as illustrated in FIG. 2A can enclose the probe (206), which prevents the probe (206) from coming in contact with the water (124). When the anode rod (112B) corrodes up to a certain point as illustrated in FIG. 2B, the probe (206) can come in contact with the water (124). In some embodiments, the probe (206) can detect such contact with the water (124), and provide a corresponding trigger output to the controller (202), for example, through the two wires (204). In some embodiments, the probe (206) described herein can be any device or connector that can hold the two ends of the two wires (204) apart. For example, the probe (206) can prevent the two wires from coming into an electrical contact with each other unless the two ends of the two wires (204) are in contact with the water (124). In some embodiments, the probe (206) may not be needed to provide the corresponding trigger output to the controller (202). For example, the tips of the two wires (204) (e.g., with or without the probe (206)) may be able to stay apart from each other without coming into an electrical contact with each other. For example, the two wires (204) may have different lengths, so that the two ends of the two wires (204) can be placed at different distances from the top of the anode rod (112A/B). For example, when the tips of the two wires (204) come in contact with the water (124), the water (124) can act as a conductor to conduct electricity between the ends of the wires (e.g., the two ends that can be connected to the probe (206) in some embodiments), which can complete an electric circuit and/or send the corresponding trigger output to the controller (202). In some embodiments, the probe (206) can be any types of sensor(s) such as water/moisture sensor(s), voltage/current sensor(s), conductivity sensor(s), etc. In some embodiments, the two wires (204) described herein can be any type of electrical wires that can conduct electricity. In some embodiments, the controller (202) can comprise an electrical circuit, an integrated circuit, a microcontroller, a processor, a microprocessor, or any electrical components that can receive a trigger output when the probe (206) comes in contact with the water (124) and send a corresponding signal to one or more indicators (208). In some embodiments, the controller (202) can comprise a memory storing instructions such as a computer program.

Continuing with FIGS. 2A and 2B, in some embodiments, the sensor system (200) can include one or more indicators (208) such as a light-emitting diode ("LED") light, a speaker, and/or a digital display to indicate that the probe (206) is in contact with the water (124). In some embodiments, in response to receiving a water trigger output from the probe (206), the controller (202) can be configured to turn on an LED light sending a light signal, to turn on a speaker sending a sound signal, and/or to turn on a digital display indicating that the probe (206) is in contact with the water (124). In some embodiments, such signal(s) from the one or more indicators (208) can alert water heater users that the used anode rod (112B) has corroded up to a certain point. In response, for example, the water heater users can replace the used anode rod (112B) with a new anode rod.

Continuing with FIGS. 2A and 2B, in some embodiments, the sensor system (200) can be powered by a power source (210) such as a power outlet (e.g., 110-220 volts electrical outlet) and/or a portable power source such as a battery (e.g., any commercially available batteries with any voltage). Such power source, for example, can be integrated with the controller (202), and the controller (202) can distribute the power accordingly to other components such as the two wires (204), the probe (206), and the one or more indicators (208). In some embodiments, the one or more indicators (208) can be configured to indicate the status of the power source (210). For example, an LED light and/or a speaker can be configured to release a light/sound signal indicating the strength or the presence of the power source (210). In some embodiments, a portable power source such as a battery may be preferable. For example, a power outlet may not be available in the location where the water heater is installed.

Embodiment 2

Figure 3B:
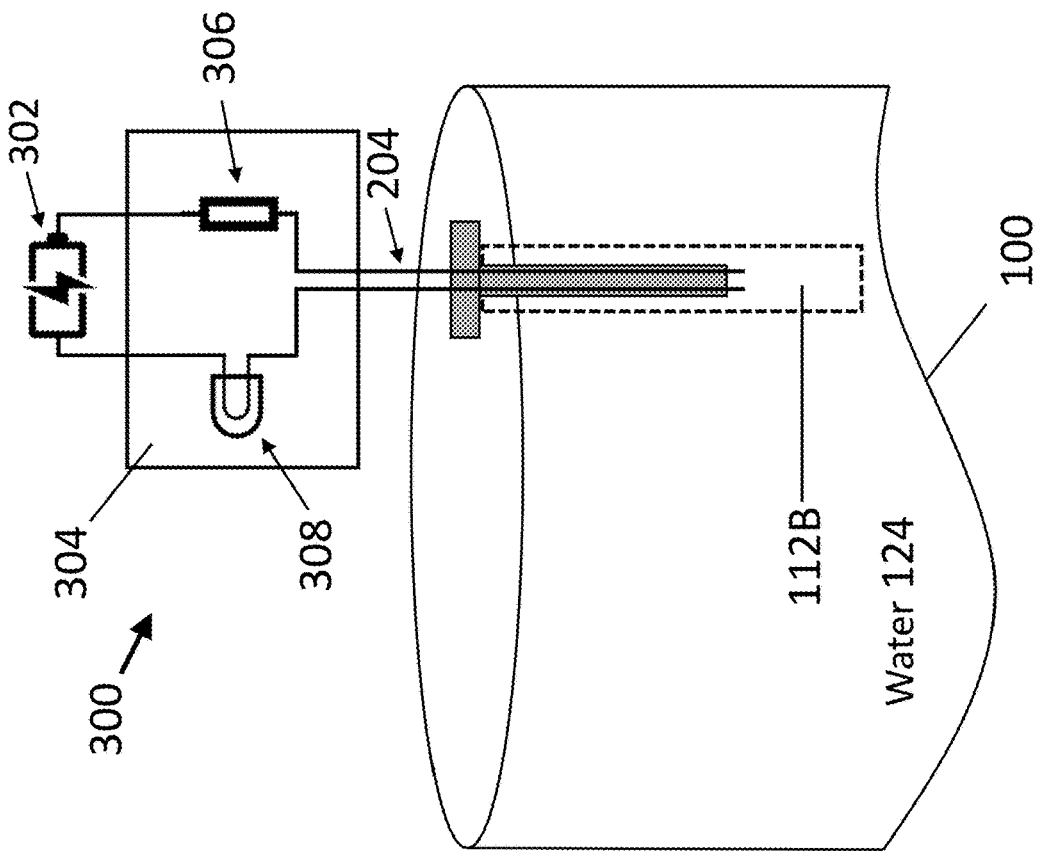
FIG. 3A and FIG. 3B are exemplary diagrams of a sensor system (300) in accordance with some embodiments.
Figure 3A:
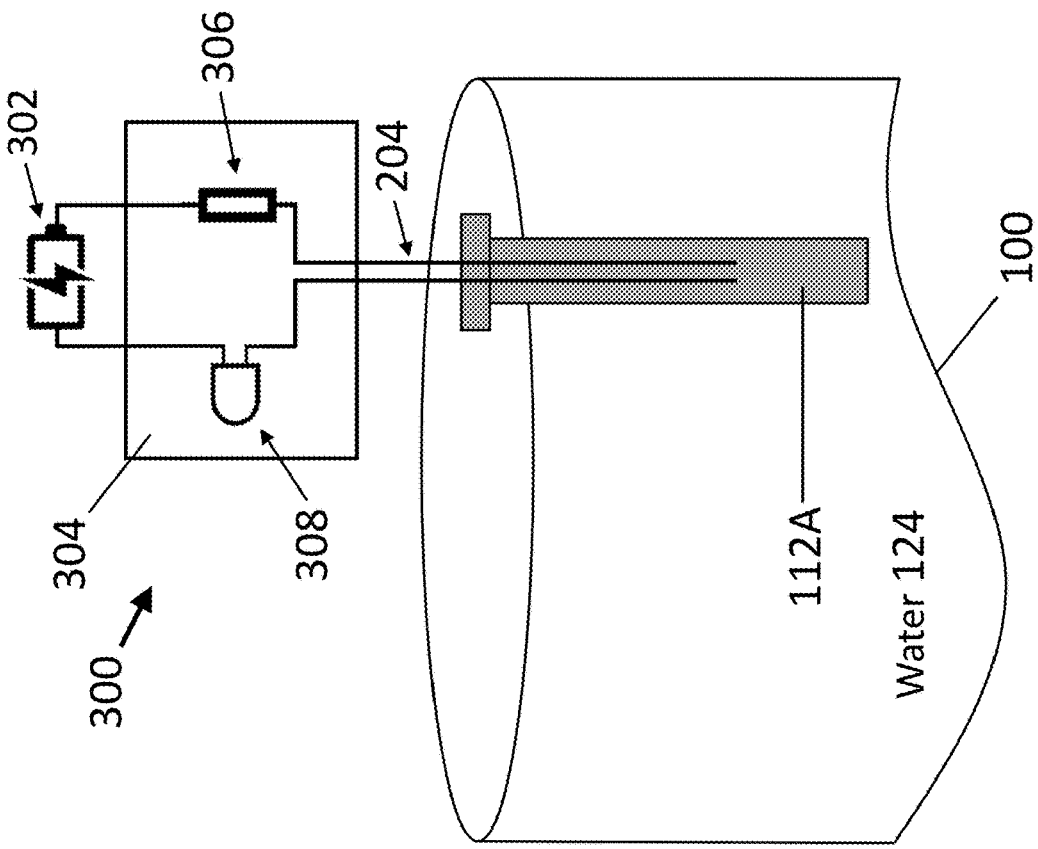

FIGS. 3A and 3B show exemplary diagrams of a sensor system (300) in accordance with some embodiments. In some embodiments, the sensor system (300) can comprise a power source (302) (e.g, 9V battery), a circuit board (304) with a resistor (306) and a light indicator (308) (e.g., LED light), and an anode rod (112A/B) with two wires (204).

In some embodiments, as illustrated in FIG. 3A, the anode rod (112A) can enclose the tips of the two wires (204), which prevents the tips of the two wires (204) from coming in contact with the water (124). In some embodiments, as illustrated in FIG. 3B, when the anode rod (112B) corrodes up to a certain point, the tips of the two wires (204) can be exposed and come in contact with the water (124). The water (124) can act as a conductor to complete the electric circuit between the two wires (204), which can, for example, cause the light indicator (308) to emit a light signal. For example, the light signal from the light indicator (308) can be in predetermined colors and/or brightness to indicate that the anode rod (112B) has been corroded to a certain point. The light signal from the light indicator (308) can also be continuously on or blink periodically to indicate that the anode rod (112B) has been corroded to a certain point. In response to the light signal, for example, the water heater users can replace the used anode rod (112B) with a new anode rod.

In some embodiments, a resistor (306) can be used to limit some of the electric current that can flow through the light indicator (308) when the two wires (204) come in contact with the water (124). For example, too much current to the light indicator (308) can cause damage, and may burn out the light indicator (308), In contrast, too little current may not allow the light indicator (308) to emit a light signal. In some embodiments, the resistance value of the resistor (306) can be adjusted (e.g., using any commercially available resistors with various resistance values) to limit some current to the light indicator (308) to prevent damage while allowing enough current to flow to the light indicator (308) to emit a light signal. In some embodiments, different types of resistors with different resistance value can be used to limit the current from different types of power sources (204) to different types of light indicators (308). For example, when using a 9V battery as the power source (302), a 100 kilo-Ohm resistor (306) can be used with an LED light indicator (308). In some embodiments, a speaker indicator (e.g., buzzer) can be added in addition to or replace the light indicator (308).

Embodiment 3

Figure 4B:
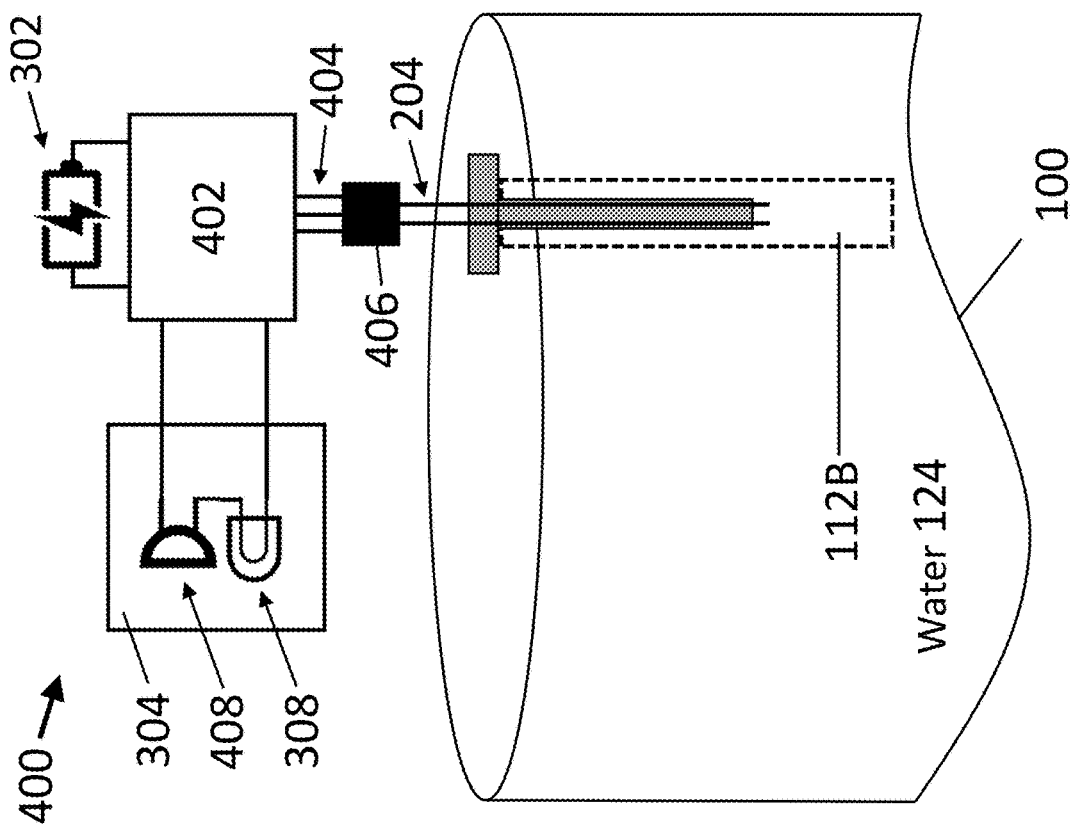
FIG. 4A and FIG. 4B are exemplary diagrams of a sensor system (400) in accordance with some embodiments.
Figure 4A:
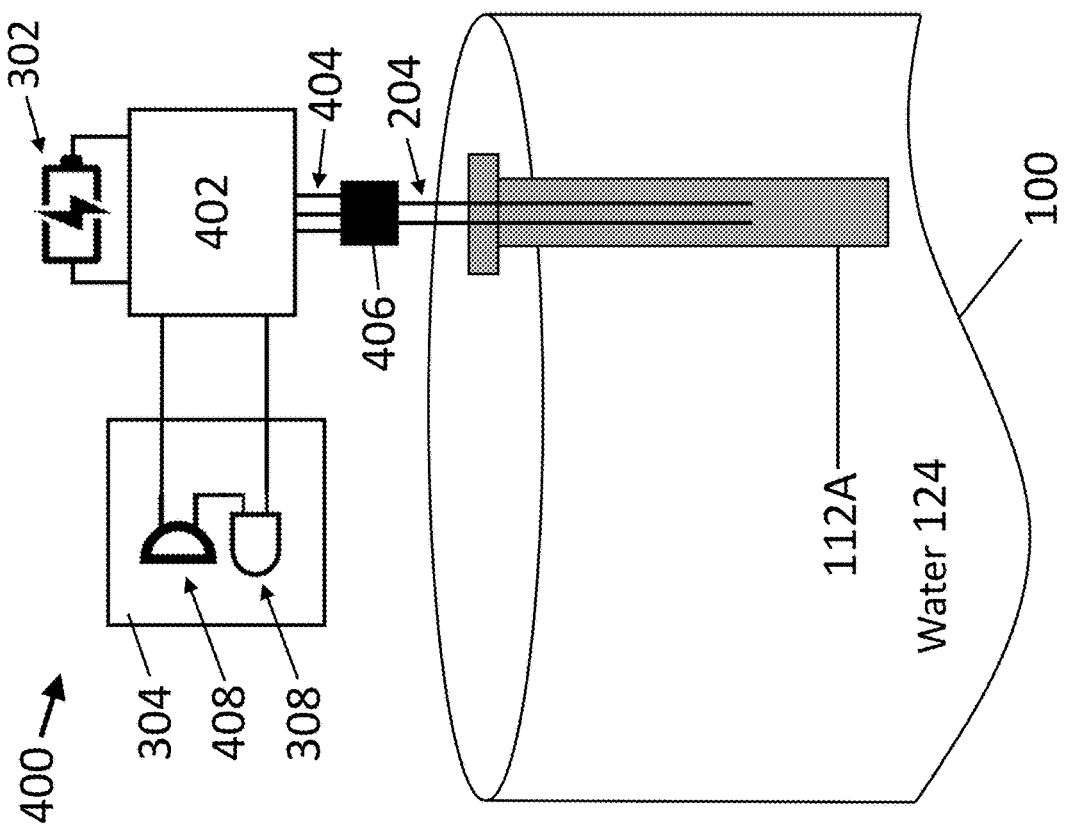
Figure 5:
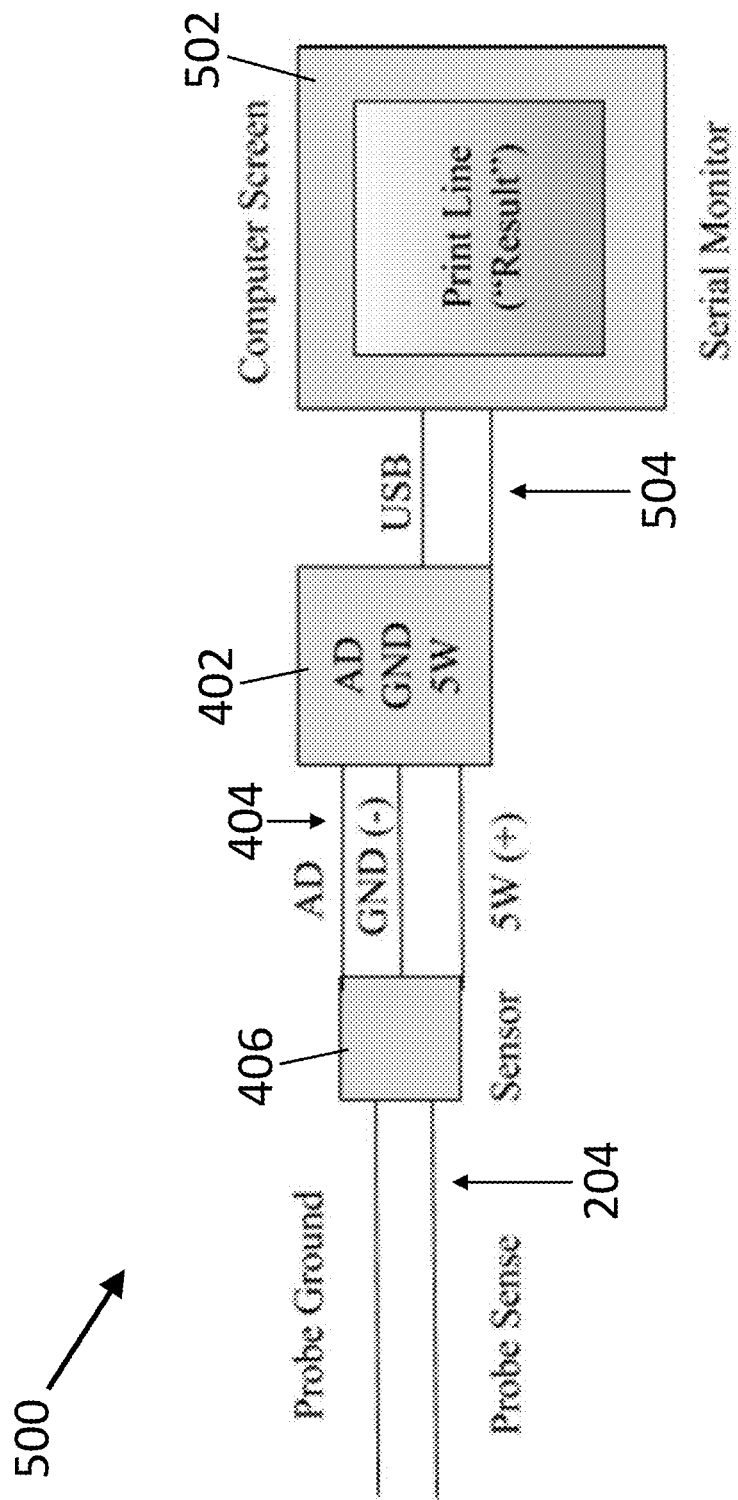
FIG. 5 is an exemplary diagram of a sensor system (500) in accordance with some embodiments.

FIG. 4A and FIG. 4B show exemplary diagrams of a sensor system (400) in accordance with some embodiments. In some embodiments, the sensor system (400) can comprise a power source (302), a circuit board (304) with a light indicator (308) and a speaker indicator (408), a digital display, a microcontroller (402), a sensor (406) (e.g., water moisture sensor), and an anode rod (112A/B) with two wires (204) that are coupled to the sensor (406). In some embodiments, the sensor (406) can be connected to the microcontroller (402) with three wires (404) (e.g., a first wire can be configured to transmit a sensor value measured by the sensor (406) to the microcontroller (402), a second wire can be a ground wire, and a third wire can be configured to transmit power to the sensor (406)). The three wires (404) are also illustrated in FIG. 5. For example, the microcontroller (402) and the sensor (406) can be purchased from Arduino, which is an open-source hardware and software company that designs and manufactures microcontrollers for various use.

In some embodiments, the sensor (406) can be configured to detect water moisture at the tips of the two wires (204) and output a sensor value (e.g., value that corresponds to the water moisture level) to the microcontroller (402). For example, the sensor (406) can be configured to measure the conductivity between the tips of the two wires (204) and output a corresponding sensor value. As illustrated in FIG. 4A or 4B, one of the three wires (404) can be configured to transmit the sensor value to the microcontroller (402). For example, more water moisture near the tips of the two wires (204) can result in a lower water moisture sensor value (or higher water moisture sensor value), and less water moisture near the tips of the two wires (204) can result in a higher water moisture sensor value (or lower water moisture sensor value). In some embodiments, the sensor (406) can be configured to continuously or periodically measure the water moisture sensor value. For example, the sensor system (400) can conserve power by periodically measuring and evaluating the water moisture sensor value. If a battery is used as the power source (302), it may be desirable to conserve the battery power in order to replace the battery less frequently. For example, the sensor (406) and the microcontroller (402) can be configured to measure and output the water moisture sensor value once in a second, once in a minute, once in an hour, once in a day, or any other time period. For example, when using a fully charged 9V battery as the power source (302), the battery capacity may last up to a year if the sensor is configured to measure and transmit the sensor value once every five minutes.

As illustrated in FIG. 4A, the anode rod (112A) can enclose the tips of the two wires (204), which prevents the tips of the two wires (204) from contacting the water (124). When the tips of the two wires are not touching the water (124), the sensor (406) can measure and output a sensor value indicating a low water moisture level (e.g., the tips of the two wires (204) are dry) to the microcontroller (402). In some embodiments, as illustrated in FIG. 4B, when the anode rod (112B) corrodes up to a certain point, the tips of the two wires (204) can contact the water (124). When the tips of the two wires (204) are touching the water (124), the sensor (406) can measure and output a sensor value indicating a high-water moisture level (e.g., the tips of the two wires (204) are wet) to the microcontroller (402). In some embodiments, the microcontroller (402) can be configured such that when the sensor value from the sensor is approximately equal to or exceeds a certain threshold, the microcontroller (402) can send signals to turn on the light indicator (308), the speaker indicator (408), and/or any other form of indicator. For example, the light indicator (308) can be an LED light that creates a light signal in certain colors and/or brightness to indicate that the anode rod (112B) has been corroded to a certain point. The light signal can also be continuously on or blink periodically to indicate that the anode rod (112B) has been corroded to a certain point. For example, the speaker indicator (408) can be a buzzer that creates a sound signal (e.g., buzz sound) with certain loudness to indicate that the anode rod (112B) has been corroded to a certain point. in another example, the speaker indicator (408) can be any type of speaker that generates a sound signal to indicate that the anode rod (112B) has been corroded to a certain point. In response to the light or sound signal from the light indicator (308) and/or the speaker indicator (408), for example, the water heater users can replace the used anode rod (112B) with a new anode rod.

FIG. 5 is an exemplary diagram of a sensor system (500) in accordance with some embodiments. The sensor system (500) illustrated in FIG. 5 is similar to the sensor system (400) as illustrated in FIGS. 4A and 4B, but the sensor system (500) can also comprise a display device (502) coupled to the microcontroller (402) via a Universal Serial Bus ("USB") cable (504). In some embodiments, the display device (502) can be coupled to the microcontroller (402.) using other means. For example, any type of transmitter can be used to send a notification to be displayed by a display device (502). In some embodiments, the display device (502) can be a computer monitor or any digital display device configured to display the sensor value measured by the sensor (406) and/or the software code for the microcontroller (402).

In some embodiments, the microcontroller (402) can be an Arduino microcontroller configured to execute the exemplary software code as shown below:

```
int Buzzer = 13;
int sensorValue = A0;
void setup( ) {
         // assigns OUTPUT to Buzzer
         pinMode(Buzzer, OUTPUT);
}
// assigns Signal cable to A0 pin and the data to var sensorValue
void loop( ) {
         sensorValue = analogRead(A0);
         Serial.begin(9600);
         // read the input on analog pin 0:
         // print out the value you read:
      Serial.print("result");
         Serial.println(sensorValue);
         // if the sensor reads a value of below 400, the buzzer rings
      if (sensorValue<500)
{digitalWrite (Buzzer, HIGH);}
else
{ digitalWrite (Buzzer, LOW);}
         delay(0001);         // delay for 3 seconds in between reads
}
```

In some embodiments, the microcontroller (402) executing the above exemplary code can be configured to read the sensor value from the sensor (406) using one of the three wires (404) that is connected to an A0 pin of the microcontroller (402). The microcontroller (402) can also display the sensor value on the display device (502) where the sensor value can be anywhere from zero to any value that is higher than five hundred. In some embodiments, a sensor value that is less than five hundred can indicate that the two wires (204) are wet (e.g., exposed to the water (124)), and a sensor value that is five hundred or above can indicate that the two wires (204) are dry (e.g., enclosed in the anode rod (112A)). When the sensor value from the sensor (406) is less than five hundred, the microcontroller (402) executing the above exemplary code can send a "high" output signal to the speaker indicator (408) (e.g., buzzer) to generate a sound signal (e.g., a loud sound signal to indicate that the anode rod has been corroded to a certain point). When the received sensor value from the sensor (406) is five hundred or above, the microcontroller (402) executing the above exemplary code can send a "low" output signal to the speaker indicator (408) to generate quiet sound or no sound at all. For example, the speaker indicator can be configured to generate quiet sound to indicate that the microcontroller (402) has a sufficient power source (302), is functioning properly, and/or the anode rod has not been corroded to a certain point. In some embodiments, the microcontroller (402) executing the above exemplary code can be configured to periodically read and evaluate the sensor value (e.g., create a delay between the sensor value readings by executing the above exemplary code periodically). For example, the microcontroller (402) can conserve power by periodically reading and comparing the sensor value to the threshold. If a battery is used as the power source (302) for the microcontroller (402), it may be desirable to conserve the battery power in order to replace the battery less frequently.

Embodiment 4

Figure 6:
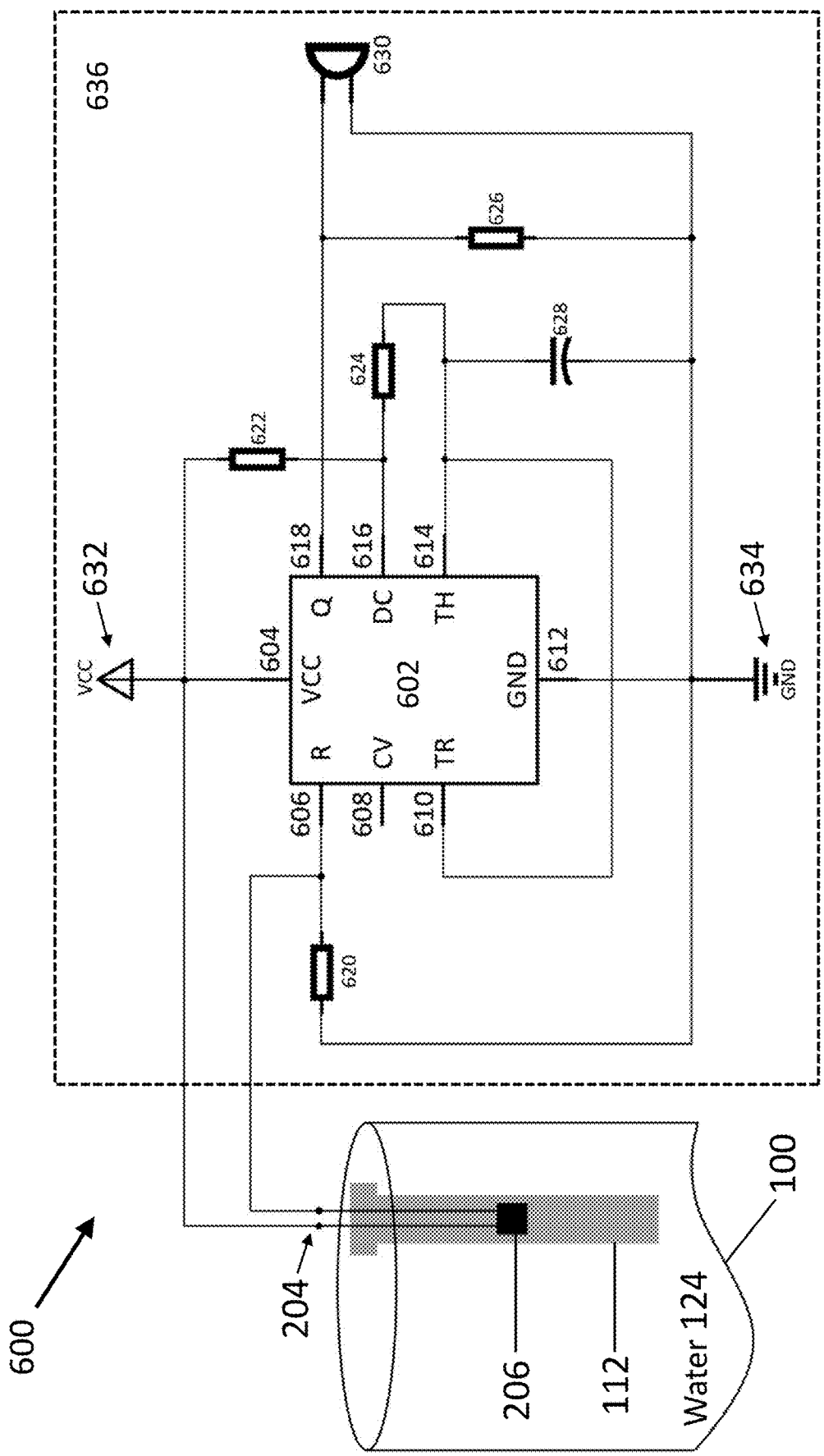
FIG. 6 is an exemplary diagram of a sensor system (600) in accordance with some embodiments.

FIG. 6 is an exemplary diagram of a sensor system (600) in accordance with some embodiments. In some embodiments, the sensor system (600) comprises a power source (632), a power switch (not shown in FIG. 6), a light indicator (not shown in FIG. 6), a speaker indicator (630), an integrated circuit (602), resistors (620-626), a capacitor (628), and an anode rod (112) with two wires (204) and a probe (206). In some embodiments, all or parts of the sensor system (600) can be enclosed in a container (636) as illustrated in FIG. 6. For example, a container (636) can be a case (or any form of housing) made of plastic, wood, metal, etc, that is large enough to include some parts of the sensor system (600). In some embodiments, a container (636) can be made by 3D printing (e.g., using a 3D printer), molding, casting, machining, joining, etc. In some embodiments, a container (636), which encloses all or parts of the sensor system (600), can be attached to the water heater (100). For example, a container (636) can include one or more magnets to use the magnetic force to attach the container (636) to any metal parts of the water heater (100). In another example, a container (636) can be attached to the water heater (100) using tapes, screws, nuts, bolts, zip tie, etc.

In some embodiments, an integrated circuit (602) can be a 555 timer integrated circuit ("555 timer IC"), which is a commercially available integrated circuit with various electronic applications. For example, a 555 timer IC can be an integrated circuit with three internally connected resistors with the same resistance values (e.g., three 5 kilo-Ohm resistors can be connected in series), comparators, flip-flop circuits, etc. A 555 timer IC, for example, can provide various electronic functions such as a timer, an oscillator, etc.

In some embodiments, as illustrated in FIG. 6, a 555 timer IC (602) can be configured with eight pins (604-612) labeled as: VCC pin (604), where VCC is short for voltage at the common collector; R pin (606), where R is short for reset; CV pin (608), where CV is short for control voltage; TR pin (610), where TR is short for trigger; GND pin (612), where GND is short for ground; TH pin (614), where TH is short for threshold; DC pin (616) where DC is short for discharge; and Q pin (618), where Q is short for output.

VCC pin (604), for example, can be a positive power supply voltage pin that can be connected to a power source (632) configured to supply the VCC voltage. For example, a power source (632) supplying the VCC voltage can be one or more batteries with a voltage ranging from 1-15 voltage. In another example, a power source (632) can be any form of power source that can supply the VCC voltage.

GND pin (612), for example, can be a ground pin that can be connected to the ground (634) such as a zero-volt power supply (e.g., a negative terminal of a battery power source).

Q pin (618), for example, can be an output pin that can be configured to output a high state voltage (e.g., the VCC voltage supplied by a power source at the VCC pin (604) with/without an offset) or a low state voltage (e.g., a ground or zero voltage supplied at the GND pin (612)) depending on voltage input(s) at different pins as described herein.

CV pin (608), for example, can be a control voltage pin. In some embodiments, the CV pin (608) can be used to control the output at the Q pin (618).

TR pin (610), for example, can be a trigger pin that can be configured to cause the 555 timer IC (602) to output a high state voltage at the Q pin (618) when the voltage supplied to the TR pin (610) drops below one-third of the VCC voltage.

TH pin (614), for example, can be a threshold pin that can be configured to cause the 555 timer IC (602) to output a low state voltage at the Q pin (618) when the voltage supplied at the TH pin (614) is about or higher than two-thirds of the VCC voltage.

DC pin (616), for example, can be a discharge pin that can be configured to cause the 555 timer IC (602) to discharge the capacitor (628) when the output of the Q pin (618) is a low state voltage. For example, when the output of the Q pin (618) is a high state voltage, the 555 timer IC can be configured to turn off the DC pin (616) thereby preventing the capacitor (628) from discharging and allowing the capacitor (628) to charge (e.g., if the capacitor (628) is connected to a power source (632), the capacitor (628) can be charged by the power source (632)). When the output of the Q pin (614) is a low state voltage, the 555 timer IC can be configured to turn on the DC pin (616) thereby allowing the capacitor (628) to discharge through the GND pin (612), which is connected to the ground (634).

R pin (606), for example, can be a reset pin that can be configured to reset or disable the 555 timer IC (602). For example, when the R pin (606) is connected to the power source (632), the 555 timer IC (602.) can be configured to function without resetting or disabling itself. When the R pin (606) is connected to the ground (634) or supplied with a low voltage (e.g., about 0.8V or less), the 555 timer IC (602) can be configured to reset or disable itself (e.g., output a low state voltage from the Q pin (618)). In some embodiments, the R pin (606) can be configured to override both the trigger function of the TR pin (610) and the threshold function of the TH pin (614). Therefore, when the R pin (606) is grounded or supplied with a low voltage, the 555 timer IC can be disabled (e.g., output a low state voltage from the Q pin (618)) regardless of the input(s) to the TR pin (610) and/or the TH pin (614). In some embodiments, the R pin (606) can be configured to override the discharge function of the DC pin (616). For example, when the R pin (606) is grounded or supplied with a low voltage, the 555 timer IC may be disabled by turning off the discharge pin, thereby preventing the capacitor (628) from discharging its electrical charges through the DC pin (616).

Continuing with FIG. 6, in some embodiments, a speaker indicator (630) such as a buzzer can be connected to the Q pin (618). In some embodiments, the 555 timer IC (602) can be configured to output a periodically oscillating electronic signal from the Q pin (618), which can cause the speaker indicator (630) to generate a sound at a certain pitch/frequency. For example, the Q pin (618) can output an oscillating electronic signal that alternates between a high state voltage and a low state voltage at a certain frequency depending on the resistance value(s) of the resistors (e.g., 622 and 624) and/or the capacitance value of the capacitor (628). Different frequency output of the Q pin (618), for example, can cause the speaker indicator (630) to generate sound with different pitch/frequency. For example, an oscillating electronic signal output with a higher frequency from the Q pin (618) can cause the speaker indicator (630) to generate sound with a higher pitch, and a lower frequency output from the Q pin (618) can cause the speaker indicator (630) to generate sound with a lower pitch. In some embodiments, a light indicator such as an LED light can be connected to the Q pin (618), and the frequency output of the Q pin (618), for example, can cause the light indicator to blink at the corresponding frequency. For example, a light indicator can be connected to the Q pin (618) in addition to (or in place of) the speaker indicator (630). In some embodiments, a light indicator can be connected to the sensor system (600) to indicate that the sensor system (600) and/or the 555 timer IC (602) is turned on or off. In some embodiments, a light indicator can be connected to the sensor system (600) to indicate the power level (e.g., battery capacity) of the power source (632). For example, an LED light can be connected to the power source (632) to indicate that the power source (632) is supplying sufficient power to the sensor system (600).

Continuing with FIG. 6, in some embodiments, the two wires (204) in the anode rod (112) are connected to the power source (632) and the R pin (606). For example, one of the two wires (204) can be connected to the power source (632) and the other of the two wires (204) can be connected to the R pin (606). As illustrated in FIG. 6 (and also in FIGS. 2A, 3A, and 4A), the anode rod (112) can enclose the tips of the two wires (204) coupled to the probe (206), and prevent the water (124) from contacting the tips of the two wires (204) coupled to the probe (206). For example, when the tips of the two wires (204) coupled to the probe (206) are not electrically connected (e.g., not in contact with the water (124)), the grounded R pin (606) can disable the 555 timer IC (602) and cause the 555 timer IC (602) to output a low state voltage from the Q pin (618). Therefore, when the two wires (204) are not electrically connected (e.g., the tips of the two wires (204) and/or the probe (206) are not in contact with the water (124)), the 555 timer IC (602) can be disabled, and the speaker indicator (630) can be turned off. When the anode rod (112) corrodes up to a certain point (e.g., as illustrated in FIGS. 2B, 3B, and 4B), the tips of the two wires (204) coupled to the probe (206) can be exposed and come in contact with the water (124). The water (124), for example, can act as an electrical conductor to complete the electric circuit between the tips of the two wires (204), which can supply the VCC voltage of the power source (632) to the R pin (606). As discussed above, for example, when the R pin (606) is supplied with the VCC voltage of the power source (632), the 555 timer IC (602) can be configured to function without resetting or disabling itself. For example, when the R pin (606) is supplied with the VCC voltage, the 555 timer IC (602) can be configured to output a periodically oscillating electronic signal from the Q pin (618) and cause the speaker indicator (630) to generate a sound at a certain pitch/frequency. Therefore, when the two wires (204) are electrically connected (e.g., when the tips of the two wires (204) coupled to the probe (206) are exposed to the water), the 555 timer IC (602) can cause the speaker indicator (630) to generate a sound. In response to the sound from the speaker indicator (630), for example, the water heater users can replace the used anode rod with a new anode rod.

Continuing with FIG. 6, in some embodiments, the 555 timer IC (602) can be configured to output a periodically oscillating electronic signal from the Q pin (618) by connecting (e.g., electrically shorting) the TR pin (610) and the TH pin (614). For example, when the R pin (606) is supplied with the VCC voltage, connecting the TR pin (610) and the TH pin (614) can cause the 555 timer IC (602) to continuously re-trigger itself and output a periodically oscillating electronic signal from the Q pin (618). An exemplary operation of the 555 timer IC (602) including the re-triggering and the oscillating electronic signal output process of the 555 timer IC (602) is described below with more details.

Continuing with FIG. 6, in some embodiments, the sensor system (600) can initially have the capacitor (628) that is uncharged. For example, the sensor system (600) can be connected to the power source (632) with a power switch (not shown in FIG. 6), and turning on the power switch can allow the power source (632) to charge the capacitor (628) through the two resistors (622 and 624). For example, as the capacitor (628) charges up, the voltage input to the TR pin (610) and the TH pin (614) can also increase. In some embodiments, when the R pin (606) stays grounded (e.g., the tips of the two wires (204) coupled to the probe (206) are not in contact with the water (124)), the 555 timer IC (602) can be disabled. For example, the DC pin (616) can be disabled (turned off) to prevent the capacitor (628) from discharging, and the charged capacitor (628) can remain substantially charged without discharging its charges through the DC pin (616). In some embodiments, when the R pin (606) is grounded, the sensor system (600) can be configured to consume a low amount of power. For example, when the R pin (606) is grounded, the sensor system (600) can initially draw power from the power source (632) to charge the capacitor (628), and the sensor system (600) can be configured not to draw any additional power from the power source (632) until the R pin (606) is supplied with the VCC voltage. As described herein, for example, the R pin (606) can be supplied with the VCC when the tips of the two wires (204) come in contact with the water (124) thereby completing the electrical circuit between the two wires (204). For example, when using a battery as the power source (632), the sensor system (600) can be configured to draw little power from the battery to prolong the battery life. In some embodiments, the sensor system (600) can have a light indicator (e.g., an LED light) to indicate the status of the power source (632). For example, an LED light can be configured to generate a light signal continuously or blink periodically to indicate that the sensor system (600) is turned on or off. In such cases, for example, the sensor system (600) can be configured to draw power to operate the LED light.

In some embodiments, for example, when the R pin (606) is supplied with the VCC voltage of the power source (632) (e.g., when anode rod (112) corrodes up to a certain point such that the tips of the two wires (204) coupled to the probe (206) are in contact with the water (124)), the 555 timer IC (602) can be configured to turn off the reset/disabling function. For example, the R pin (606) supplied with the VCC voltage input can cause the 555 timer IC (602) not to override the trigger function of the TR pin (610), the threshold function of the TH pin (614), and the discharge function of the DC pin (616). For example, the TH pin (614) can receive the voltage input from the capacitor (628), which can be charged to a threshold voltage of about two-thirds of the VCC voltage or higher. When the TH pin (614) receives the threshold voltage of about two-thirds of the VCC voltage or higher, the 555 timer IC (602) can be configured to output a low state voltage from the Q pin (618) and allow the capacitor (628) to discharge its charges through the DC pin (616). As the capacitor (628) discharges, for example, the voltage input from the capacitor (628) to both the TR pin (610) and the TH pin (614) decreases. For example, as the capacitor (628) discharges, the TR pin (610) can receive the decreased voltage input from the capacitor (628), which can be about one-third of the VCC voltage or lower. When the TR pin (610) receives the voltage that is about one-third of the VCC voltage or lower, the 555 timer IC (602) can be triggered by the TR pin (610) to output a high-state voltage from the Q pin (618) and turn off the DC pin (616) to stop the capacitor (616) from discharging. The high state voltage output from the Q pin (618), for example, can cause the speaker indicator (630) to generate a sound. At the same time, for example, the power source (632) can recharge the capacitor (628) through the two resistors (622 and 624). As the capacitor (628) recharges, for example, the voltage input to the TR pin (610) and the TH pin (614) can also increase. When the TH pin (614) is supplied with the threshold voltage of about two-thirds of the VCC voltage or higher, the 555 timer IC (602) can be configured to output a low state voltage from the Q pin (618) and allow the capacitor (628) to discharge its charges through the DC pin (616). As the capacitor (628) discharges, its voltage input to the TR pin (610) can drop to the trigger voltage of about one-third of the VCC voltage or lower. Therefore, the 555 timer IC (602), for example, can be re-triggered by the TR pin (610) to re-output a high-state voltage from the Q pin (618) and turn off the DC pin (616) to stop the capacitor (616) from discharging.

In some embodiments, connecting the TR pin (610) and the TH (614) pin can therefore continuously re-trigger the 555 timer IC to output a periodically oscillating electronic signal from the Q pin (618). As discussed above, for example, when the capacitor (628) is charged to the threshold voltage (e.g., two-thirds of the VCC) or higher, the TH pin (614) is triggered and can cause the 555 timer IC (602) to discharge the capacitor (628) and output a low state voltage from the Q pin (618). When the capacitor (628) is discharged to the trigger voltage (e.g., one-third of the VCC) or lower, the TR pin (610) is triggered and can cause the 555 timer IC (602) to recharge the capacitor (628) and output to a high state voltage from the Q pin (618). For example, this re-triggering by the TR pin (610) and the TH pin (614) can happen continuously at a certain frequency, thereby generating a periodically oscillating electronic signal from the Q pin (618).

In some embodiments, a frequency of the oscillating electronic signal output from the Q pin (618) can be adjusted by changing the resistance values of the two resistors (622 and 624) and/or the capacitance value of the capacitor (628). For example, increasing the resistance values of the two resistors (622 and 624) and/or the capacitance value of the capacitor (628) can decrease the frequency of the oscillating electronic signal output from the Q pin (618) (e.g., it can take a longer time period to charge the capacitor (628)). In another example, decreasing the resistance values of the two resistors (622 and 624) and/or the capacitance value of the capacitor (628) can increase the frequency of the oscillating electronic signal output from the Q pin (618) (e.g., it can take a shorter time period to charge the capacitor (628)). For example, increasing the resistance values of the two resistors (622 and 624) and/or the capacitance value of the capacitor (628) can take a longer period of time to charge/discharge the capacitor (628), which can cause the frequency to decrease. In contrast, for example, decreasing the resistance values of the two resistors (622 and 624) and/or the capacitance value of the capacitor (628) can take a shorter period of time to charge/discharge the capacitor (628), which can cause the frequency to increase. In some embodiments, the resistance values of the two resistors (622 and 624) and/or the capacitance value of the capacitor (628) can be adjusted to change the pitch of the sound generated by the speaker indicator (630). For example, the resistors and the capacitor can be any commercially available products.

In some embodiments, the power source (632) can be a 9V battery, the resistor (620) can be a 1 kilo-Ohm resistor, the resistor (622) can be a 22 kilo-Ohm resistor, the resistor (624) can be a 570 Ohm resistor, the resistor (626) can be a 1 kilo-Ohm resistor, and the capacitor (628) can be a 1 micro-Farad capacitor. The sensor system (600) with such exemplary power source, resistors, and capacitor has been tested to generate a sound that can alert the water heater users when the anode rod (112) has been corroded to a certain point. The sensor system (600) with such exemplary power source, resistors, and capacitor has been also tested to consume low battery power so that the battery power can be used efficiently.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A sensor system for a water heater comprising:
two electrical wires, each electrical wire having a first end and a second end, wherein the first ends of the two electrical wires are disposed within a cavity of an anode rod disposed in water in a water heater such that, when the anode rod is sufficiently corroded, the first ends come in contact with the water in the water heater;
a controller coupled to the second ends of the two electrical wires, the controller configured to detect whether the water is in contact with the first ends of the two electrical wires; and
an indicator coupled to the controller, the indicator configured to provide an indication when the controller detects that the water is in contact with the first ends of the two electrical, wherein the anode rod further comprises
a corrodible sheath in contact with the water in the water heater, and
a stay rod disposed in a center of the corrodible sheath, and located adjacent or near the cavity.

2. The sensor system of claim 1, wherein the corrodible sheath comprises a material selected to be one or more from the group consisting of magnesium, aluminum, zinc, and tin.

3. The sensor system of claim 1, further comprising a probe configured to hold the first ends of the two electrical wires apart, wherein the probe is disposed within the cavity.

4. The sensor system of claim 1, wherein the indicator is selected to be one or more from the group consisting of a light, an audible alert, and a transmitter for sending a notification to be displayed by a display device.

5. The sensor system of claim 1, wherein the controller comprises a microcontroller executing instructions to:
periodically measure conductivity between the first ends of the two electrical wires;
compare the measured conductivity to a threshold to determine whether the water is in contact with the first ends of the two electrical wires; and
cause the indicator to provide the indication when the measured conductivity is equal to or exceeds the threshold.

6. The sensor system of claim 5, further comprising a conductivity sensor configured to:
measure the conductivity between the first ends of the two electrical wires, and
transmit the measured conductivity to the microcontroller.

7. The sensor system of claim 1, further comprising a power source configured to provide power to the controller, wherein the controller comprises a 555 timer integrated circuit ("555 timer IC") with a plurality of pins, the 555 timer IC configured to:
receive a voltage of the power source in a reset pin of the 555 timer IC when the water is in contact with the first ends of the two electrical wires, wherein the reset pin and the power source are coupled to the second ends of the two electrical wires; and
in response to receiving the voltage of the power source in the reset pin, output an oscillating electronic signal in an output pin coupled to the indicator.

8. The sensor system of claim 7, further comprising:
a power source configured to provide power to the controller;
a light-emitting diode coupled to the power source to indicate a power level of the power source; and
a plurality of resistors and a capacitor coupled to the 555 timer IC, wherein a frequency of the oscillating electronic signal output is controlled by adjusting resistance of the plurality of resistors and capacitance of the capacitor.

9. The sensor system of claim 1, further comprising a housing configured to attach to the water heater, wherein the controller is disposed within the housing.

10. The sensor system of claim 9, wherein the housing comprises a magnet for attaching the housing to a metal part of the water heater.

11. The sensor system of claim 1, wherein the water heater comprises a metal in contact with the water, and the corrodible sheath comprises a material that, when in contact with the water, corrodes before the metal.

12. A method for detecting a corrosion of an anode rod, the method comprising:
contacting the anode rod with water in a water heater, the anode rod having a cavity disposed therein;
providing two electrical wires, each electrical wire having a first end and a second end, wherein the first ends of the two electrical wires are disposed within the cavity such that, when the anode rod is sufficiently corroded, the first ends come in contact with the water in the water heater;
detecting, using a controller coupled to the second ends of the two electrical wires, whether the water is in contact with the first ends of the two electrical wires; and
indicating to a water heater user, using an indicator coupled to the controller, when the controller detects that the water is in contact with the first ends of the two electrical wires.
wherein the anode rod further comprises
a corrodible sheath in contact with the water in the water heater, and
a stay rod disposed in a center of the corrodible sheath, and located adjacent or near the cavity.

13. The method of claim 12, wherein the corrodible sheath comprises a material selected to be one or more from the group consisting of magnesium, aluminum, zinc, and tin.

14. The method of claim 12, further comprising holding the first ends of the two electrical wires apart using a probe, wherein the probe is disposed within the cavity.

15. The method of claim 12, wherein the indicator is selected to be one or more from the group consisting of a light, an audible alert, and a transmitter for sending a notification to be displayed by a display device.

16. The method of claim 12, wherein the controller comprises a microcontroller, the method further comprising:
periodically measuring, using a conductivity sensor, conductivity between the first ends of the two electrical wires;
sending the measured conductivity to the microcontroller;
comparing, using the microcontroller, the measured conductivity to a threshold to determine whether the water is in contact with the first ends of the two electrical wires; and
controlling the indicator, using the microcontroller, to indicate to the water heater user when the measured conductivity is equal to or exceeds the threshold.

17. The method of claim 12, wherein the controller comprises a 555 timer integrated circuit ("555 timer IC") with a plurality of pins, the method further comprising:
providing power, from a power source, to the controller;
receiving a voltage of the power source in a reset pin of the 555 timer IC when the water is in contact with the first ends of the two electrical wires, wherein the reset pin and the power source are coupled to the second ends of the two electrical wires; and
in response to receiving the voltage of the power source in the reset pin, outputting an oscillating electronic signal in an output pin of the 555 timer IC coupled to the indicator.

18. The method of claim 17, further comprising:
providing power, from a power source, to the controller;
indicating, using a light-emitting diode light coupled to the power source, a power level of the power source;
attaching a plurality of resistors and a capacitor to the 555 timer IC; and
controlling a frequency of the oscillating electronic signal output by adjusting resistance of the plurality of resistors and capacitance of the capacitor.

* * * * *